United States Patent Office 3,646,168
Patented Feb. 29, 1972

3,646,168
OIL AND OZONE RESISTANT ELASTOMER
BLENDS COMPRISING EPDM RUBBER
Robert E. Barrett, Baton Rouge, La., assignor to Copolymer Rubber & Chemical Corporation, Baton Rouge, La.
No Drawing. Continuation-in-part of application Ser. No. 575,972, Aug. 30, 1966, now Patent No. 3,492,371, which is a continuation-in-part of application Ser. No. 551,517, May 20, 1966. This application Jan. 22, 1970, Ser. No. 5,155
Int. Cl. C08f 37/18; C08d 9/08
U.S. Cl. 260—889
31 Claims

ABSTRACT OF THE DISCLOSURE

A rubber composition having good oil and ozone resistance formed of a curable blend of rubbery polymer and an EPDM copolymer formed by interpolymerization of monomers including a 5-alkylidene-2-norbornene having at least 2 carbon atoms in the alkylidene group and having an effective unsaturation of at least 2 carbon-to-carbon double bonds per 1000 carbon atoms in the interpolymer.

---

This application is a continuation-in-part of my copending application Ser. No. 575,972, filed Aug. 30, 1966, entitled "Oil and Ozone Resistant Elastomer Blends Comprising EPDM Rubber," now U.S. Pat. 3,492,371, which is a continuation-in-part of my application Ser. No. 551,-517, filed May 20, 1966, entitled "Oil and Ozone Resistant Elastomers," now abandoned.

This invention relates to novel curable elastomeric blends containing highly unsaturated oil resistant rubbers and rubbers prepared by polymerizing monomeric mixtures of alpha monoolefins and polyenes. The invention further relates to the cured elastomeric blends of the invention.

Highly unsaturated synthetic rubbers such as polychloroprene and nitrile rubber are employed in the manufacture of a wide variety of rubber articles which, when in use, will be contacted with oils, greases, and hydrocarbon solvents. While these rubbers are oil resistant, they are subject to attack by elemental oxygen and especially ozone. The resistance to oxidation and oxidative degeneration may be improved by the addition of an antioxidant, or antiozonant, but this increases the cost of the rubber and also many of the antioxidants and antiozonants presently in use are staining.

It is known that oxidation resistant elastomers may be prepared by interpolymerizing a monomeric mixture composed of ethylene and at least one higher alpha monoolefin in solution in an organic solvent and in the presence of a Ziegler polymerization catalyst. However, the resulting saturated elastomers are not sulfur vulcanizable and substances other than sulfur must be used for curing purposes such as the organic peroxides.

In the interest of simplifying the discussion hereinafter, the sulfur curable elastomers prepared by interpolymerizing a monomeric mixture containing ethylene, a higher alpha monoolefin containing 3–16 carbon atoms and a polyene will be referred to as ethylene-propylene-diene monomer (EPDM) rubber. However, the EPDM rubber used in the practice of this invention is a special EPDM rubber in which the polyene includes a 5-alkylidene-2-norbornene in which the alkylidene group has at least 2- carbon atoms and preferably 2 to 20 carbon atoms. When this term is used, it is understood that interpolymerizable straight chain alpha monoolefins containing 4–16 and preferably 4–10 carbon atoms may be substituted for at least part of the propylene, and that interpolymerizable polyenes in general may be substituted for all or part of the diene monomer. The effective unsaturation level in EPDM rubbers may be as low as 2 and as high as 60–100 carbon-to-carbon double bonds per 1000 carbon atoms. The EPDM rubbers having a low effective unsaturation level, i.e., less than 7 and usually 2–5 carbon-to-carbon double bonds per 1000 carbon atoms, may be prepared following the same general procedure as described hereinafter for the EPDM rubbers having an effective high unsaturation level, i.e., at least 7 carbon-to-carbon double bonds per 1000 carbon atoms, with the exception of providing a monomeric mixture to be polymerized which contains less of the polyene. Therefore, the polyene is present in the reaction mixture during the polymerization in an amount to result in the desired content of chemically bound polyene in the resulting polymer, and to thereby provide the desired effective unsaturation level.

It is an object of the present invention to provide novel curable blends of oil resistant rubbers and EPDM rubber.

It is a further object to provide novel curable blends prepared from polychloroprene and EPDM rubber which have good oil resistance in combination with outstanding ozone resistance.

It is still a further object to provide novel sulfur vulcanizable blends of nitrile rubber and EPDM rubber which have unexpectedly good ozone and oil resistance in combination.

It is still a further object to provide the novel cured elastomeric blends of the invention.

Still other objects and advantages of the invention will be apparent to those skilled in the art upon reference to the following detailed description and the accompanying examples.

The blends of the invention may contain about 1–95 parts by weight of the EPDM rubber for each 99–5 parts by weight of the highly unsaturated oil resistant rubber to be described more fully hereinafter. In most instances, it is preferred that the EPDM rubber be present in an amount of about 1–50 parts by weight for each 99–50 parts by weight of the oil resistant rubber. When it is desired to impart outstanding ozone resistance to the blend, then the EPDM rubber should be present in an amount of at least 15 parts by weight for each 85 parts by weight of the oil resistant rubber, and preferably in an amount of about 15–30 parts by weight for each 85–70 parts by weight of the oil resistant rubber.

Examples of the highly unsaturated oil resistant rubbers for use in preparing the blends include rubbery homopolymers of homopolymerizable halogenated conjugated diolefins containing about 4–10 carbon atoms, rubbery interpolymers of conjugated diolefins or halogenated conjugated diolefins containing 4–10 carbon atoms and ethylenically unsaturated nitriles interpolymerizable therewith such as acrylonitrile and alkyl-substituted acrylonitriles wherein the alkyl group contains 1–5 carbon atoms, and mixtures thereof. In some instances, rubbery interpolymers of the above halogenated conjugated diolefins with a small percentage of an alpha monoolefin may be used, such as interpolymers containing 1–25% and preferably 1–10% by weight of chemically bound styrene, vinyl naphthalene, propylene or alpha monoolefins in general containing 3–5 carbon atoms. Examples of conjugated diolefins include 1,3-butadiene, isoprene, 2,3-dimethyl-1,3-butadiene and piperylene. Examples of halogenated conjugated diolefins include chloroprene and 2,3-dichloro-1-3-butadiene, and the corresponding bromo- and fluoro-derivatives. Examples of ethylenically unsaturated nitriles include acrylonitrile, methacrylonitrile, ethacrylonitrile, and the corresponding straight or branched chain alkyl-substituted acrylonitriles containing 3, 4 or 5 carbon atoms. The preferred oil resistant rubbers include polychloroprene, copolymers of chloroprene and acrylonitrile, and copolymers of 1,3-butadiene and acrylonitrile, methacrylonitrile or ethacrylonitrile.

Interpolymers containing about 5–60% by weight of chemically bound nitrile monomer and 95–40% by weight of chemically bound conjugated diolefin and/or halogenated diolefin monomer may be used. However, within this range, better results are obtained when the chemically bound nitrile monomer content is at least 15% or 20% by weight, and for best results at least 35–45% by weight. A copolymer of 1,3-butadiene and acrylonitrile containing about 30–50% by weight of chemically bound acrylonitrile is usually preferred. Copolymers of chloroprene and acrylonitrile containing about 30–50% by weight of bound acrylonitrile also may be used.

As a general rule, better oil resistance is obtained when the blends of the invention contain higher percentages by weight of chemically bound nitrile monomer and/or halogenated conjugated diolefin monomer. For example, each 100 parts by weight of the blend should contain at least 15 parts or 20 parts by weight and preferably at least 25–40 parts by weight, of chemically bound nitrile monomer when a nitrile rubber is used in preparing the blend. Good results are obtained when each 100 parts by weight of the blend contains about 20–35 parts by weight of the chemically bound nitrile monomer, and the best results with at least 33 parts by weight of the nitrile monomer. When a homopolymer or interpolymer of a halogenated diolefin monomer is used, the blend may contain the halogenated diolefin monomer chemically bound therein in the amounts set out above for the nitrile monomer, but much larger amounts may be present such as up to about 50–95 parts by weight and preferably about 60–85 parts by weight for each 100 parts by weight of the blend.

The preparation and properties of the highly unsaturated oil resistant rubbers are well known and are described in a large number of issued United States patents and other publications, including the following: Introduction to Rubber Technology, edited by M. Morton, Reinhold Publishing Corporation, New York (1959); Synthetic Rubber Technology, volume I, by W. S. Penn, Maclaren and Sons, Ltd., London (1960); Rubber, Fundamentals of Its Science and Technology, J. Le Bras, Chemical Publishing Company, Inc., New York (1957); and Linear and Stereoregular Addition Polymers, N. G. Gaylord et al., Interscience Publishers, New York (1959). Typical commercially available elastomers are described in the text "Compounding Ingredients for Rubbers," 3rd edition, Cuneo Press of New England, Cambridge, Mass. The above publications are incorporated herein by reference.

The EPDM elastomers used in preparing the blends of the invention are the products resulting from interpolymerizing in solution in an organic polymerization solvent and in the presence of a Ziegler catalyst a monomeric mixture containing ethylene, at least one alpha monoolefin having 3–15 carbon atoms, and preferably a straight chain alpha monoolefin having 3–10 carbon atoms, and a polyunsaturated bridged-ring compound having at least one carbon-to-carbon double bond in a bridged ring, as represented by 5-alkylidene-2-norbornenes having 2 or more carbon atoms in the alkylidene group. In general, the basic reaction conditions may be the same as those employed in the prior art for preparing EPDM rubbers.

In the aforementioned parent application description is made of the use of an EPDM rubber in which the interpolymer is formed of ethylene and propylene or other monoolefin containing from 3–16 carbon atoms in a molar ratio of 80:20 to 20:80 of ethylene to propylene in the combined elastomer and in which the third monomer in the form of a 5-alkylidene-2-norbornene is present in an effective unsaturation level of at least 7–30 and preferably 10–25 carbon-to-carbon double bonds per 1000 carbon atoms in the total polymer.

It has now been found that blends having unexpected improvements in tensile strength, elongation and modulus with reduced compression set can be produced with the EPDM rubber blended when the uncured highly unsaturated hydrocarbon rubber is formulated to embody a molar ratio of ethylene to propylene which exceeds 80:20 but is less than a molar ratio of 95:5 ethylene to propylene and preferably in the ratio of 80:20 to 90:10. Under these conditions, the amount of effective unsaturation derived from the third monomer of 5-alkylidene-2-norbornene, in which the alkylidene group contains at least 2 carbon atoms, can be less than 7 carbon-to-carbon double bonds per 1000 carbon atoms and, in fact, may be as low as 2 carbon-to-carbon double bonds per 1000 carbon atoms up to 60 or more and preferably within the range of 2–25 carbon-to-carbon double bonds per 1000 carbon atoms without interfering with the cocurability between the EPDM rubber and the highly unsaturated hydrocarbon rubber in the blend.

It has also been found that within the previously described range of 80:20 to 20:80 moles of ethylene to propylene bound in the EPDM polymer, good blendability without interfering with the cocure during cure or sulfur vulcanization can be achieved when the amount of third monomer is reduced to provide an effective unsaturation of less than 7 but more than 2 carbon-to-carbon double bonds per 1000 carbon atoms of the polymer when the third monomer is limited to 5-alkylidene-2-norbornene in which the alkylidene group contains from 2–20 carbon atoms such as 5-propylidene-2-norborene, 5-butylidene-2-norbornene, 5-heptylidene-2-norbornene, 5-isopentylidene-2-norbornene, 5-dodecylidene-2-norbornene, and preferably 5-ethylidene-2-norbornene.

In instances where it is desired to prepare a tetrapolymer, or a polymer from more than five different monomers, then one or more alpha monoolefins containing 4–16 and preferably 4–10 carbon atoms may be substituted for an equal molar quantity of bound propylene in the above-mentioned monomer compositions. Straight chain alpha monoolefins are usually preferred. When preparing tetrapolymers, the range of the fourth monomer will normally be about 5–20 mole percent, but smaller amounts may be present such as 1, 2, 3 or 4 mole percent.

Specific examples of 5-alkylidene-2-norbornenes which may be used include 5-methylene-2-norbornene, 5-ethylidene-2-norbornene, 5-n-propylidene-2-norbornene, 5-isopropylidene - 2-norbornene, 5-n-butylidene-2-norbornene and 5-isobutylidene-2-norbornene. The elastomer prepared from 5-ethylidene-2-norbornene is much preferred as it has outstanding properties and produces many unusual and unexpected results. As a result, this elastomer is in a class by itself.

For some reason which is not fully understood at the present time, elastomers prepared from monomeric mixtures containing ethylene, at least one higher alpha monoolefin having 3–16, and preferably 3–10, carbon atoms such as propylene, and certain polyunsaturated bridged ring compounds such as 5-ethylidene-2-norbornene have a much more rapid cure rate when cured with sulfur than would be predicted from the calculated or theoretical carbon-to-carbon double bond content. In such instances, the apparently higher unsaturation level is embraced within the term "effective" unsaturation level of the elastomer in the specification and claims. As is set out in detail hereinafter, the elastomers described herein may be analyzed to determine the effective unsaturation level, as expressed in carbon-to-carbon double bonds per 1000 carbon atoms, by the consumption of bromine, correcting for the substitution reaction by a kinetic method based on the spectrophotometric method developed by Siggia et al., Anal. Chem. 35, 362 (1963). The effective carbon-to-carbon double bond content per 1000 carbon atoms in the elastomer, which may or may not be equal to the actual carbon-to-carbon double bond content, is calculated from the resulting data to determine the effective unsaturation level.

The polymerization solvent may be any suitable inert or saturated hydrocarbon which is liquid and relatively non-viscous under the reaction conditions, including the prior art solvents for the solution polymerization of monoolefins in the presence of a Ziegler catalyst. Examples of satisfactory hydrocarbon solvents include open chain saturated hydrocarbons containing 5–8 carbon atoms, of which hexane is usually preferred; aromatic hydrocarbons and especially those containing a single benzene nucleus such as benzene or toluene; and saturated cyclic hydrocarbons which have boiling ranges approximating those for the open chain and aromatic hydrocarbons discussed above, and especially saturated cyclic hydrocarbons containing 5 or 6 carbon atoms in the ring. The solvent may be a mixture of one or more of the foregoing hydrocarbons, such as a mixture of aliphatic and naphthenic hydrocarbon isomers having approximately the same boiling range as normal hexane. It is necessary that the solvent be dry and free of substances which will interfere with the Ziegler catalyst.

In general, any suitable prior art Ziegler-type catalyst may be used which is known to produce a satisfactory elastomer. Ziegler catalysts are disclosed in a large number of issued patents, such as U.S. Pats. Nos. 2,933,480, 3,093,620, 3,093,621, 3,211,709 and 3,113,115. Examples of Ziegler catalysts include metal organic coordination catalysts prepared by contacting a compound of a metal of Groups IV$a$, V$a$, VI$a$ and VII$a$ of the Mendelejeff periodic chart of the elements, as typified by titanium, vanadium and chromium halides, with an organometallic compound of a metal of Groups I, II or III of the Mendelejeff periodic chart which contains at least one carbon-metal bond, as typified by trialkyl aluminum and alkyl aluminum halides wherein the alkyl groups contain 1–20 and preferably 1–4 carbon atoms.

The preferred Ziegler catalyst for many polymerizations is prepared from a vanadium compound and an alkyl aluminum halide. Examples of suitable vanadium compounds include vanadium trichloride, vanadium tetrachloride, vanadium oxytrichloride, vanadium acetylacetonate, etc. Activators which are especially preferred include alkyl aluminum chlorides of the general formulae $R_1AlCl_2$ and $R_2AlCl$, and the corresponding sesquichlorides of the general formula $R_3Al_2Cl_3$, wherein R is a methyl, ethyl, propyl, butyl or isobutyl radical. A catalyst prepared from methyl or ethyl aluminum sesquichloride and vanadium oxytrichloride is especially preferred, and when using this catalyst, the optimum ratio of the catalyst components is usually 1 mol of vanadium oxytrichloride for each 8–20 mols of the alkyl aluminum sesquichloride.

The blends may be cured following prior art procedures, and special curing techniques are not necessary. As a general rule, the compounding ingredients and the procedure which are normally used in curing the highly unsaturated oil resistant rubber component are also satisfactory in curing the blend. Various curing procedures, including the materials and the quantities thereof to be employed, are described in a large number of publications which are well known in the art. These publications include those previously mentioned. Additional publications include Principals of High Polymer Theory and Practice, Schmidt et al., McGraw-Hill Book Company, New York (1948); Chemistry and Technology of Rubber, Davis et al., Reinhold Publishing Corporation, New York (1937); The Applied Science of Rubber, edited by W. J. S. Naunton, published by Edward Arnold, Ltd., London (1961), and the encyclopedia of Chemical Technology, Kirk and Othmer, published by Interscience Encyclopedia, Inc., New York (1953).

In instances where the blend is prepared from nitrile rubber and EPDM rubber having an unsaturation level of 2–30 carbon-to-carbon double bonds per 1000 carbon atoms, curing is preferably accomplished with heat activated curing agents including, for example, sulfur or sulfur-bearing compounds which provide sulfur at the elevated temperature used in curing. Sulfur is the preferred vulcanizing agent, and it is usually employed in an amount of about 0.5–3 and preferably about 1–2 parts by weight per 100 parts by weight of rubber in the blend. Zinc oxide, litharge and other metal oxides may be present in an amount of, for example, about 2–10 parts by weight per 100 parts by weight of rubber (phr.). Vulcanization accelerators normally used with nitrile rubbers may be present including the sulfanamide, aldehyde-amine and guanidine accelerators, and specifically tetramethylthiuram monosulfide, tetramethylthiuram disulfide, the zinc salt of dimethyldithiocarbamic acid, the piperidine salt of pentamethylenedithiocarbamic acid, N,N-diethylthiocarbamyl - 2 - mercaptobenzothiazole and 2-mercaptoimidazoline. The vulcanization may be, for example, at a temperature of about 250–350° F. for a period of about 15–120 minutes. Reinforcing and pigmenting agents such as carbon black may be present in an amount of, for example, 5–100 parts by weight, or fatty acids or soaps in an amount of, for example, 0.5–3 parts by weight per 100 parts by weight of rubber. Softeners and plasticizers also may be present, such as aromatic oils, esters and polar-type derivatives, inlcuding coumarone-indene resin, dibutyl phthalate, dibutyl sebacate, dioctyl phthalate, octadecene nitrile, tricresyl phosphate and tributoxyethyl phosphate. Such plasticizers and softeners may be present in an amount of, for example, about 5–100 parts by weight per 100 parts by weight of rubber.

In instances where the blend contains an oil resistant rubber prepared from a halogenated conjugated diolefin such as chloroprene, then different curing agents and curing conditions may be preferred. The sulfur or sulfur-bearing compounds and accelerators that are useful in the vulcanization of nitrile rubbers may be present, but the rate of cure is slow and the usual curing agents and curing conditions for polychloroprene rubber give better results. Polychloroprene rubber may be cured by heat alone without any added curing agent, but preferably metallic oxides are present such as the usual combination of zinc oxide and magnesium oxide. In some instances, a mixture may be used of the metal oxides, sulfur and/or sulfur-providing compounds, and the typical rubber accelerators mentioned herein such as the guanidines, tetramethylthiuram monosulfide, 2-mercaptobenzothiazole, di-o-tolylguanidine salt of dicatechol borate, 2-mercaptoimidazoline and p,p'-diaminodiphenylmethane. Reinforcing or pigmenting agents such as carbon black, whiting, calcium silicate and magnesium carbonate, or the softeners and plasticizing agents described above, may be present in the amounts mentioned for the nitrile rubbers.

The compounding ingredients and curing procedures mentioned herein are intended to be illustrative examples only. It is understood that the compounding ingredients and curing conditions which are normally employed in the prior art for the specific oil resistant rubber used in preparing the blend may be used in compounding and curing the blend of the present invention. Therefore, upon reference to the texts mentioned herein, it is possible to arrive at a wide variety of specific ingredients and conditions for use in compounding and curing the blends. Additionally, in the curing of blends containing polymers of halogenated conjugated dienes such as chloroprene and nitrile rubbers, it is often possible to employ a combination of the curing agents and conditions which have been used in the prior art for the curing of the individual polymers.

The cured blends prepared in accordance with the present invention may be used for the same purposes as the oil resistant rubbers have been used heretofore. Additionally, the cured blends may be used in environments where a combination of oil resistance and ozone resistance are of importance, such as in gaskets, rubber hoses, electrical insulations, etc. for use in the vicinity of internal combustion engines.

The blends described herein may be prepared from the component rubbers by any suitable convenient prior art procedure. For example, latices or organic solvent solutions prepared from the component rubbers may be admixed in the desired ratios, and the resulting blends of rubber latices or solutions may be used as such or the blends may be coagulated to produce solid rubber blends. The blends also may be prepared conveniently from the solid component rubbers by admixing the same in desired ratios on a prior art rubber mill, or in a Banbury mixer.

The foregoing detailed description and the following specific examples are for purposes of illustration only, and are not intended as being limiting to the spirit or scope of the appended claims.

EXAMPLE I

This example illustrates the preparation of an ethylene-propylene - 5 - ethylidene-2-norbornene terpolymer having an unsaturation level of 7.2 carbon-to-carbon double bonds per 1000 carbon atoms, and the preparation of a latex therefrom.

A one-half gallon Sutherland reactor was equipped with a high speed, heavy duty, air-driven motor, cooling coils, thermometer, temperature regulator, pressure regulator, injection port, and additional openings for monomers, catalysts and solvents fed to and from the reactor. A tube extended to the bottom of the reactor for removal of the polymer cement, which was produced on a continuous basis.

The reactor was purged for 12 hours with dry nitrogen and then the temperature was raised from ambient temperature to about 60° C. while passing hot water through the reactor coils. The reactor was flushed with propylene for 14 minutes and then the temperature was lowered to 30° C. and maintained at this temperature throughout the polymerization.

One liter of dry, Esso chemical grade hexane was added to the reactor and propylene was added until the reactor pressure was about 42.2 inches of mercury. At this time, 1.3 milliliters of a 1.5 molar solution of ethylaluminum sesquichloride were added as an additional purge for water. The pressure was then increased to 61 inches of mercury by addition of ethylene, and 6.73 millimole of 5-ethylidene-2-norbornene were added. The monomer feeds were shut off and the catalyst components, i.e., a 0.0363 molar solution of vanadium oxytrichloride and a 0.351 molar solution of ethylaluminum sesquichloride, were fed to the reactor at a constant rate until a drop in the reactor pressure was noted. The aluminum to vanadium mole ratio was 12:1. At this time, the gaseous monomers were fed into the reactor through a calibrated rotometer at a rate of about 1497 cc. per minute, of which 693 cc. were ethylene and 804 cc. were propylene. The 5-ethylidene-2-norbornene was added as a 0.30 molar hexane solution in an amount to provide an effective unsaturation level in the resulting polymer of 7.2 carbon-to-carbon double bonds per 1000 carbon atoms.

The polymerization was controlled by the catalyst pump which added the catalyst on demand as the pressure increased, thereby maintaining 61 inches of mercury pressure throughout the polymerization. When the solution became approximately 6% polymer, solvent which was saturated at room temperature with ethylene under 40 pounds per square inch pressure was fed into the reactor at the rate of 27 cc. per minute, and the polymer cement was removed continuously. The rate of production of polymer was about 85–90 grams of polymer per hour. At this time, the ethylene and propylene feeds were adjusted to 331 cc. per minute and 1804 cc. per minute respectively, and the feed rate of the solution of 5-ethylidene-2-norbornene was adjusted correspondingly, i.e., to about 4.6 cc. per minute to compensate for the unreacted monomers removed with the cement.

The solution of cement as removed from the reactor was fed into a Waring Blendor containing water where it was intimately mixed to kill the catalyst. The cement was then washed three times with equal volumes of water to remove the catalyst residue, and fed into a container filled with hot circulating water. Steam was admitted to the container to superheat the cement and remove the solvent and unreacted monomers. The resulting coagulated polymer in the form of rubber crumb was collected on a screen, washed and chopped up in a Waring Blendor, and dried at 90° C. The dried polymer was highly unsaturated and had an effective unsaturation level as determined by the consumption of bromine by the method described hereinafter of 7.2 double bonds per 1000 carbon atoms, and a Mooney value of 96 $ML_4$. The polymer was used in preparing a latex following the procedure set out below.

A benzene solution containing 5% by weight of the above prepared polymer was emulsified in an Eppenbach colloid mill. The feed to the colloid mill contained on a weight basis 100 parts of polymer in 1900 parts of benzene, 5 parts of potassium oleate, 0.5 part of Daxad–15 (polymerized sodium salt of aryl alkyl sulfonic acid), 0.3 part of tripotassium phosphate, and 2000 parts of water. The mixture was passed through the colloid mill for 30 minutes at No. 12 setting, and the resulting latex was then stripped free of the benzene solvent by steam distillation and concentrated to 27.2% solids in a disc-type concentrator. The latex was stable and had an average particle size of 2900 angstroms.

EXAMPLE II

The following example represents the manufacture of an EPDM rubber having bound ethylene to propylene in the ratio of 83:17 and with an actual unsaturation level of about 5 carbon-to-carbon double bonds per 1000 carbon atoms.

The reaction vessel was a one-gallon Sutherland reactor equipped with a high speed, heavy-duty, air driven motor; cooling coils, a thermometer; a temperature regulator; a pressure regulator; an injection port; and other openings where monomers, catalyst, and solvent were fed to the reactor. A tube dipping to the bottom of the reactor was present for the removal of the cement produced on a continuous basis. A vapor phase vent was provided to bleed off 15% of the gaseous monomer feed to prevent inert gas buildup.

The clean reactor was assembled, rinsed with dry hexane and purged overnight with dry nitrogen. In the morning the reactor bowl was heated with a flameless blowtorch and hot water was run through the coils until the temperature in the reactor was about 70° C. After this, propylene was flushed through the reactor for about 15 minutes; then the temperature was lowered to ambient and two liters of Esso chemical grade hexane, dried over 4A molecular sieves and stored over sodium, was added to the reactor. As the temperature was brought to 41° C., propylene was fed to the reactor through a 4A molecular sieve column until 19.7 inches Hg pressure was reached. The pressure was then brought up to 30 p.s.i. with ethylene fed through a 4A molecular sieve column and approximately 0.12 ml. pyridine inhibitor and 2.6 cc. of 1.5 M ethylaluminum sesquichloride were added.

The monomers were shut off and the catalysts, .165 molar ethylaluminum sesquichloride and .005 molar vanadium oxytrichloride at a 40 to 1 aluminum to vanadium ratio, were fed into the reactor at a constant rate until a drop in pressure in the reactor was noted. Also added 0.35 M butyl perchlorocrotonate at 7 to 1 ratio on vanadium. At this time the gaseous monomers were fed into the reactor through suitable calibrated rotometers at a rate of 2864 cc./minute, of which 2224 cc. were ethylene and 640 cc. were propylene; the termonomer 5-alkylidene-2-norbornene was added as a .33 M solution in hexane at 3.28 cc./minute which provided about 4.3 weight percent to be incorporated into the polymer. The polymerization was controlled by the catalyst pumps which added catalyst on demand as the pressure increased, thus maintaining the 30 p.s.i. pressure throughout the run. When the solution became approximately 7% polymer, solvent containing 16 cc./cc. ethylene was fed at the rate of 51.2 cc./minute into the reactor and the polymer cement taken off which produced about 180 g. of polymer per hour.

At this time the ethylene and propylene feeds were adjusted to 1601 cc./minute and 1534 cc./minute to compensate for the unreacted monomers removed with the cement.

The solution cement as removed from the reactor was fed into a Waring Blendor containing water where it was intimately mixed. The cement was then washed three times with equal volumes of water. The washed and stabilized cement (1 phr. on the rubber of the experimental stabilizer Irganox 1010) (Geigy) was fed with nitrogen pressure into a T joint at the bottom of a 4-liter container full of hot circulating water. The other end of the T is connected to a steam line and steam was admitted at such a rate as to superheat the rubber cement. The solvent and unreacted monomers were mostly removed by this procedure. The rubber crumb was collected on a screen, washed and chopped up in a Waring Blendor. The rubber crumb was dried in the oven at 90° C., to remove any remaining solvent and water giving a rubbery copolymer which contained 84 mole percent ethylene anlysis, and had a reduced specific viscosity in Decalin at 135° C. of 2.75. The unsaturation expressed in C=C/1000 carbon atoms was 4.8.

Curing of the dried rubber was effected by compounding a Brabender plasticorder (or Banbury size B mixer) based on 100 parts of oil-extended rubber (40 parts oil to 100 parts polymer), 200 parts carbon black, 135 parts of a naphthenic rubber processing oil, 5 parts of zinc oxide, 1 part of stearic acid, 3 parts methyl tuads, 0.5 part Captax, and 1.5 parts sulfur.

The hardness was determined on a Shore A durometer. Heat rise (ΔT ° F.) is by the Goodrich method. The slope of the cure curve was determined on a Monsanto rheometer at 250° C.

| Run | Ml., 1+8 min. | Percent elongation | 300% modulus, p.s.i. | Tensile, p.s.i. | Hardness | Cure rate |
|---|---|---|---|---|---|---|
| 298-45-364 | 70 | 270 | 1,175 | 1,425 | 73 | 9.8 |

EXAMPLE III

The following example represents the preparation of an EPDM rubber having a ratio of bound ethylene to propylene of 90:10 with an unsaturation level of 2 carbon-to-carbon double bonds per 1000 carbon atoms.

The reaction vessel was a one-gallon Sutherland reactor equipped with a high speed, heavy-duty, air driven motor; cooling coils; a thermometer; a temperature regulator; a pressure regulator; an injection port; and other openings where monomers, catalyst and solvent were fed to the reactor. A tube dipping to the bottom of the reactor was present for the removal of the cement produced on a continuous basis. A vapor phase vent was provided to bleed off 15% of the gaseous monomer feed to prevent inert gas buildup.

The clean reactor was assembled, rinsed with dry hexane and purged overnight with dry nitrogen. In the morning the reactor bowl was heated with a flameless blowtorch and hot water was run through the coils until the temperature in the reactor was about 70° C. After this, propylene was flushed through the reactor for about 15 minutes; then the temperature was lowered to ambient and two liters of Esso chemical grade hexane, dried over 4A molecular sieves and stored over sodium, was added to the reactor. As the temperature was brought to 60° C., propylene was fed to the reactor through a 4A molecular sieve column until 19.2 inches Hg pressure was reached. The pressure was then brought up to 30 p.s.i. with ethylene fed through a 4A molecular sieve column and approximately 0.12 ml. pyridine inhibitor and 2.6 cc. of 1.5 M ethylaluminum sesquichloride were added.

The monomers were shut off and the catalysts, 0.30 molar ethylaluminum sesquichloride and .009 molar vanadium oxytrichloride at 40 to 1 aluminum to vanadium ratio, were fed into the reactor at a constant rate until a drop in pressure in the reactor was noted. Also added .063 M butyl perchlorocrotonate at 7 to 1 vanadium. At this time the gaseous monomers were fed into the reactor through suitably calibrated rotometers at a rate of 2139 cc./minute, of which 1780 cc. were ethylene and 359 cc. were propylene; the termonomer ethylidene norbornene was added as a .09 M solution in hexane at 3.27 cc./minute which provided about 1.71 weight percent to be incorporated into the polymer. The polymerization was controlled by the catalyst pumps which added catalyst on demand as the pressure increased, thus maintaining the 30 p.s.i. pressure throughout the run. When the solution became approximately 5% polymer, solvent containing 16 cc./cc. ethylene was fed at the rate of 51.0 cc./minute into the reactor and the polymer cement taken off which produced about 123 g. of polymer per hour.

At this time the ethylene and propylene feeds were adjusted to 1113 cc./minute and 792 cc./minute to compensate for the unreacted monomers removed with the cement.

The solution cement as removed from the reactor was fed into a Waring Blendor containing water where it was intimately mixed. The cement was then washed three times with equal volumes of water. The washed and stabilized cement (1 phr. on the rubber of the experimental stabilizer Tergonox 1010) was fed with nitrogen pressure into a T joint at the bottom of a 4-liter container full of hot circulating water. The other end of the T is connected to a steam line and steam was admitted at such a rate as to superheat the rubber cement. The solvent and unreacted monomers were mostly removed by this procedure. The rubber crumb was collected on a screen, washed and chopped up in a Waring Blendor. The rubber crumb was dried in the oven at 90° C. to remove any remaining solvent and water giving a rubbery copolymer which contained 90.4 mole percent ethylene by infrared analysis, and has a reduced specific viscosity in Decalin at 135° C. of 2.26. The unsaturation expressed in C=C/1000 carbon atoms was 1.7.

In the following comparative tests for elongation, tensile strength, modulus of elasticity and hardness, the dried terpolymer was compounded in a Brabender plasticorder in accordance with formulations hereinafter set forth. For comparison purposes, use was made of blends with NBR rubber identified by the trade name NYsyn of 35% by weight acrylonitrile and 65% by weight butadiene. The EPDM rubber in each instance was a terpolymer of ethylene, propylene and 5-ethylidene-2-norbornene in which the mole ratio of ethylene/propylene was varied and in which the amount of third monomer was varied to provide EPDM rubbers having different amounts of carbon-to-carbon unsaturation as shown at the bottom of Tables I and II.

In these tabulations the C=C/1000 carbon atoms is the amount of actual unsaturation and corresponds approximately to 60% of the effective unsaturation values determined by the procedure set forth at the end of this specification.

TABLE I.—BLENDS OF 40 MOONEY EPDM RUBBERS WITH NBR RUBBERS

| Formulation: | Cure/ 300° F. | Batch Number | | | | |
|---|---|---|---|---|---|---|
| | | 4101 | 4103 | 4099 | 4098 | 4122 |
| NBR | | 70 | 70 | 70 | 70 | 70. |
| A EPDM rubber | | 30 | | | | |
| B EPDM rubber | | | 30 | | | |
| C EPDM rubber | | | | 30 | | |
| D EPDM rubber | | | | | 30 | |
| E EPDM rubber | | | | | | 30. |
| HAF black | | 80 | Same | Same | Same | Same. |
| DOP | | 20 | do | do | do | Do. |
| Zinc oxide | | 4 | do | do | do | Do. |
| Stearic acid | | 1.5 | do | do | do | Do. |
| Amax | | 1.5 | do | do | do | Do. |
| Sulfur | | 1.4 | do | do | do | Do. |
| Compound ML 1+4 (212° F.) | | 92 | 95 | 94 | 96 | 98. |
| Tensile, p.s.i. | 10' | 1,825 | 2,375 | 2,850 | 3,075 | 2,750. |
| | 20' | 2,025 | 2,150 | 3,000 | 3,225 | 2,575. |
| | 30' | 2,150 | 2,050 | 3,025 | 2,950 | 2,475. |
| Elongation, percent | | 220 | 240 | 300 | 330 | 300. |
| | | 210 | 200 | 280 | 280 | 240. |
| | | 210 | 190 | 240 | 250 | 210. |
| 300% modulus, p.s.i. | | | | 2,850 | 2,850 | 2,750. |
| Hardness, Shore A | | 78 | 77 | 83 | 84 | 86. |
| | | 81 | 78 | 83 | 85 | 87. |
| | | 82 | 81 | 85 | 86 | 88. |
| C=C/1000 for EPDM rubber | | 2.72 | 7.79 | 10.12 | 5.97 | 2.26. |
| Mole percent C₃ for EPDM rubber | | 66.5 | 63.6 | 83.6 | 88.5 | 90.4. |

TABLE II.—BLENDS OF 70 MOONEY EPDM RUBBERS WITH NBR RUBBERS

| Formulation: | Cure/ 300° F. | Batch Number | | | | |
|---|---|---|---|---|---|---|
| | | 4109 | 4103 | 4107 | 4108 | 4105 |
| NBR | | 70 | 70 | 70 | 70 | 70. |
| F EPDM rubber | | 30 | | | | |
| G EPDM rubber | | | 30 | | | |
| H EPDM rubber | | | | 30 | | |
| I EPDM rubber | | | | | 30 | |
| J EPDM rubber | | | | | | 30. |
| Zinc oxide | | 4 | Same | Same | Same | Same. |
| Stearic acid | | 1.5 | do | do | do | Do. |
| HAF black | | 80 | do | do | do | Do. |
| DOP | | 20 | do | do | do | Do. |
| Amax | | 1.5 | do | do | do | Do. |
| Sulfur | | 1.4 | do | do | do | Do. |
| Compound ML 1+4 (212° F.) | | 110 | 95 | 110 | 108 | 86. |
| Tensile, p.s.i. | 10' | 2,100 | 2,375 | 2,700 | 3,025 | 3,050. |
| | 20' | 2,175 | 2,150 | 2,425 | 3,125 | 3,250. |
| | 30' | 2,150 | 2,050 | 2,950 | 3,125 | 3,325. |
| Elongation, percent | | 210 | 240 | 240 | 280 | 320. |
| | | 190 | 200 | 190 | 250 | 270. |
| | | 180 | 190 | 210 | 230 | 280. |
| 300% modulus p.s.i. | | | | | | 2,850. |
| | | | | | | clear |
| Hardness, Shore A | | 79 | 77 | 83 | 82 | 85. |
| | | 80 | 78 | 83 | 84 | 86. |
| | | 80 | 81 | 83 | 84 | 87. |
| C=C/1000 for EPDM Rubber | | 2.91 | 7.79 | 10.61 | 9.41 | 7.22. |
| Mole percent C₃ for EPDM Rubber | | 61.4 | 63.6 | 80.8 | 81.9 | 88.4. |

NOTE.—DOP is dioctyl phthalate; Amax is N-oxydiethylene benzothiazole-2-sulfenamide; ML 1+4 (212° F.) is the Mooney value taken at 212° F.; Tensile, elongation and 300% modulus are determined in accordance with ASTM Method D412-62T; Hardness was determined with a Shore A durometer; C=C/1000 is actual unsaturation as measured by bromination procedures.

To the present, it was believed that the C=C unsaturation in the EPDM rubber was the most significant factor in the physical properties developed between various blends. It has now been found, somewhat surprisingly, that once the blended EPDM interpolymer exceeds 70 and preferably 75 ethylene to 30 and preferably 25 propylene ratio bound in the interpolymer, a complete change occurs wherein the ethylene content becomes the important controlling factor in the development of such physical properties as tensile strength, elongation, modulus and green strength whereby the amount of unsaturation is of lesser importance so that the desired involved values can be achieved with blends of EPDM rubbers at levels as low as 2 carbon-to-carbon double bonds per 1000 carbon atoms when the ethylene/propylene ratio in the interpolymer exceeds 70 and preferably 75 ethylene to 30 and preferably 25 propylene ratio.

Heretofore any EPDM rubber above 80:20 ethylene/propylene was believed to be too hard to work and useless for blending purposes. It has now been found that such EPDM polymers having carbon-to-carbon double bonds ranging from 2 or more and preferably 2–60 carbon-to-carbon double bonds per 1000 carbon atoms of the polymer, can be highly loaded and worked in a Banbury and compounded to produce rubber blends of the type described having excellent physical and mechanical properties.

The EPDM polymers described herein may be analyzed as set out below to determine the effective unsaturation level by the consumption of bromine correcting for the substitution reaction by a differential kinetic method based on the spectrophotometric method developed by Siggia et al., Anal. Chem. 35, 362 (1963). The basis of the method is the determination of the differences in rates of addition and substitution of bromine ($Br_2$) with ethylenically unsaturated linkages. The rate of reaction is determined by monitoring the disappearance of the bromine photometrically as a function of time. A sharp break occurs when the rapid addition reaction to the carbon-to-carbon double bonds is complete and the slow substitution reaction continues. Extrapolation of a kinetic plot (pseudo first order) to a time of zero ("0") will give the amount of bromine remaining after addition to the carbon-to-carbon double bonds was complete. The change in bromine concentration is taken as the measure of the effective unsaturation level in the elastomer.

Materials (1) Bromine solution, 0.0125 Molar in $CCl_4$ (2.0 g. of $Br_2$/liter of $CCl_4$).

(2) Aqueous potassium iodide solution containing 10 grams of KI in 100 ml. of water.

(3) Mercuric chloride catalyst solution containing 0.2 g. of mercuric chloride dissolved in 100 ml. of 1,2-dichloroethane.

(4) Starch indicator solution.

(5) Aqueous sodium thiosulfate solution, 0.01 Normal accurately standardized.

(6) Carbon tetrachloride, reagent grade.

(7) Spectrophotometer (visible range) having sample and reference cells that can be stoppered.

(8) Stopwatch (if a non-recording photometer is used).

Calibration (1) With the standard 0.01 N $Na_2S_2O_3$ solution, titrate to the starch-iodine endpoint duplicate 10.00 ml. samples of the 0.0125 M bromine solution to which 5 ml., of the 10% KI solution and 25 ml. of distilled water have been added.

(2) From the standard 0.0125 M bromine solution, prepare a series of five calibration standards of the following concentrations: 0.5, 1, 2, 3, and 4 millimoles of $Br_2$/liter.

(3) Determine the absorbance in the sample cell of each of the five calibration standards at a wavelength setting of 415 m$\mu$ versus $CCl_4$ in the reference cell. Then prepare a plot from the resulting data of absorbance versus the exact concentration of $Br_2$ contained in the calibration standards, plotted as millimoles of $Br_2$/liter, to obtain a calibration curve.

(4) Determine the slope of the calibration curve thus obtained for use in the equation:

$$\text{Br}_2 \text{ in millimoles/liter} = \text{Absorbance} \times \frac{1}{\text{slope of calibration curve}}$$

Analysis (1) Dissolve about 1.25 grams of the dry polymer to be analyzed in 50 ml. of $CCl_4$ (or take sufficient polymer cement to contain about 1.25 grams of the polymer). Precipitate the polymer by pouring the solution into 400 ml. of isopropyl alcohol with vigorous stirring provided by a Waring Blendor.

(2) Filter the precipitated polymer and squeeze out the excess liquid.

(3) Dissolve the once precipitated polymer from Step 2 in 50 ml. of $CCl_4$, precipitate the polymer again by pouring into 400 ml. of isopropyl alcohol as in Step 1, and filter and remove excess liquid as in Step 2.

(4) Immediately redissolve the twice precipitated undried polymer from Step 3 in about 50 ml. of $CCl_4$ in a Waring Blendor. Filter the solution through glass wool into a 2-ounce narrow-mouth bottle that can be stoppered to prevent evaporation. Determine the solids content by evaporation of duplicate 5.0 ml. samples of the polymer solution. A hypodermic syringe is convenient for measuring the polymer solutions.

(5) Set the spectrophotometer[1] at the wave-length of 415 m$\mu$.

(6) Check the concentration of the 0.0125 M bromine solution daily before use by determining the absorbance of a known dilution.

(7) To the sample photometer cell, add 1.00 ml. of the 0.2% $HgCl_2$ solution as a catalyst and 1.00 ml. of the standard 0.0125 M solution of bromine in $CCl_4$.

(8) Prepare a polymer blank by adding to the reference cell 0.50 ml. of the polymer solution from Step. 4, 1.50 ml. of $CCl_4$ and 1.00 ml. of the 0.2% $HgCl_2$ solution, shake well, and place the photometer reference cell in the instrument.

(9) Discharge 0.50 ml. of the polymer solution[2] and 0.50 ml. of $CCl_4$ into the photometer cell containing the catalyst and bromine solution from a hypodermic syringe starting the stopwatch the instant of mixing (or the recorder if a recording spectrophotometer is used). Stopper the cell and thoroughly agitate the mixture before placing the cell in the instrument.

(10) Record the 415 m$\mu$ wavelength absorbance of the mixture at one minute intervals. Continue recording time and absorbance values until the faster addition rate of bromine to the double bonds is complete and the slower substitution reaction is well defined. (Usually 10–15 minutes is sufficient). Prepare a plot from the resulting data of absorbance versus time to obtain an absorbance curve for the analyzed sample.

Calculations (1) Extrapolate the linear portion of the absorbance curve (i.e., the portion for the substitution reaction) for the analyzed sample to zero time[3], and record the absorbance value for zero time.

(2) Determine the final $Br_2$ concentration by inserting the absorbance value at zero time which was obtained above, and the slope of the calibration curve, in the following equation. The final $Br_2$ concentration, which is the concentration of $Br_2$ at the end of the rapid addition reaction, is then calculated.

$$\text{Final Br}_2 \text{ concentration in millimoles/liter} = \text{Absorbance at zero time} \times \frac{1}{\text{slope of calibration curve}}$$

(3) Calculate the effective unsaturation level as carbon-to-carbon double bonds per 1000 carbon atoms in the polymer from the following equation:

$$\text{Effective unsaturation level expressed as carbon-to-carbon double bonds per 1000 carbon atoms in the polymer} = \frac{(A-B)\ (C)\ (14)\ (100)}{(1000)\ (D)\ (E)}$$

Where

A = initial $Br_2$ concentration, millimoles/liter
B = final $Br_2$ concentration, millimoles/liter
C = milliliters of solution in the sample photometer cell
D = percent solids of polymer in the polymer solution (based on the weight of the polymer in grams/volume of the solvent in milliliters)
E = milliliters of the polymer solution in the sample photometer cell.

---

[1] The spectrophotometer should be adjusted to the wavelength setting of maximum absorption since the bromine absorption curve is very sharp and even small errors in the wavelength setting cannot be tolerated.

[2] The sample size selected will permit analysis of polymers containing 2 to 10 C=C/1000 carbon atoms. Polymers with unsaturation levels above this range can be analyzed but the polymer concentration must be reduced proportionately.

[3] Extrapolation of the absorbance curve for the sample being analyzed gives essentially the same results as extrapolation of a kinetic plot but with a considerable saving in time.

I claim:

1. A curable blend of rubbery polymers consisting essentially of about 1–95 parts by weight of highly unsaturated rubbery polymer selected from the group consisting of rubbery polymers of homopolymerizable halogenated conjugated diolefins containing 4–10 carbon atoms, rubbery interpolymers of said halogenated conjugated diolefins and ethylenically unsaturated alpha monoolefins interpolymerizable therewith, rubbery interpolymers of conjugated diolefins containing 4–10 carbon atoms and ethylenically unsaturated nitriles interpolymerizable therewith selected from the group consisting of acrylonitrile and alkyl-substituted acrylonitriles wherein the alkyl substituent contains 1–5 carbon atoms, and rubbery interpolymers of said halogenated conjugated diolefins and said ethylenically unsaturated nitriles interpolymerizable therewith, and mixtures thereof, for each 99–5 parts by weight of a rubbery interpolymer which is the product of the interpolymerization of ethylene, at least one alpha monoolefin containing 3–16 carbon atoms and an alkylidene norbornene in which the alkylidene group has from 2–20 carbon atoms, the rubbery interpolymer having a mol ratio of chemically bound ethylene to the alpha monolefin containing 3–16 carbon atoms which exceeds 80:20 but is less than 95:5 and having an effective unsaturation level of at least 2 carbon-to-carbon double bonds per 1000 carbon atoms.

2. The blend of claim 1 wherein the rubbery interpolymer has an effective unsaturation level of about 2–60 carbon-to-carbon double bonds per 1000 carbon atoms and is present in an amount of about 1–50 parts by weight for each 99–50 parts by weight of the said highly unsaturated rubbery polymer.

3. The blend of claim 1 wherein the rubbery interpolymer is present in an amount of about 15–30 parts by weight for each 85–70 parts by weight of the highly unsaturated rubbery polymer.

4. The blend of claim 1 wherein the halogenated conjugated diolefin monomer and nitrile monomer which are chemically bound therein are present in an amount to provide at least 15 parts by weight of the said chemically bound monomers for each 100 parts by weight of the blend.

5. The blend of claim 1 wherein the rubbery interpolymer is the product of the interpolymerization of ethylene, propylene and 5-ethylidene-2-norbornene.

6. The blend of claim 5 wherein the rubbery interpolymer has an effective unsaturation level of 2–25 carbon-to-carbon double bonds per 1000 carbon atoms.

7. The blend of claim 6 wherein the rubbery interpolymer has an effective unsaturation level of about 2–25 carbon-to-carbon double bonds per 1000 carbon atoms and is present in an amount of about 15–30 parts by weight for each 85–70 parts by weight of the highly unsaturated rubbery polymer, and the halogenated conjugated diolefin monomer and the nitrile monomer which are chemically bound therein are present in an amount to provide at least 20 parts by weight of the said chemically bound monomers for each 100 parts by weight of the blend.

8. The blend of claim 1 wherein the highly unsaturated rubbery polymer is nitrile rubber, the rubbery interpolymer is the product of the interpolymerization of ethylene, at least one straight chain alpha monoolefin having 3–10 carbon atoms and the alkylidene norbornene, and the rubbery interpolymer is present in an amount of about 1–50 parts by weight for each 99–50 parts by weight of the nitrile rubber.

9. The blend of claim 8 wherein the rubbery interpolymer is present in an amount of about 15–30 parts by weight for each 85–70 parts by weight of the nitrile rubber.

10. The blend of claim 9 wherein the nitrile monomer which is chemically bound in the nitrile rubber is present in an amount to provide at least 25 parts by weight of chemically bound nitrile monomer for each 100 parts by weight of the blend.

11. The blend of claim 8 wherein the rubbery interpolymer is the product of the interpolymerization of ethylene, propylene and 5-ethylidene-2-norbornene.

12. The blend of claim 11 wherein the rubbery interpolymer has an effective unsaturation level of about 2–25 carbon-to-carbon double bonds per 1000 carbon atoms, the nitrile rubber is a copolymer of 1,3-butadiene and acrylonitrile and the acrylonitrile is chemically bound therein in an amount to provide at least 20 parts by weight of chemically bound acrylonitrile for each 100 parts by weight of the blend.

13. The blend of claim 12 wherein the rubbery interpolymer has an effective unsaturation level of about 2–25 carbon-to-carbon double bonds per 1000 carbon atoms and is present in an amount of about 15–30 parts by weight for each 85–70 parts by weight of the nitrile rubber, the nitrile rubber is a copolymer of 1,3-butadiene and acrylonitrile and the acrylonitrile is chemically bound therein in an amount to provide at least 33 parts by weight of chemically bound acrylonitrile for each 100 parts by weight of the blend.

14. The product obtained by curing the blend of claim 1 with a heat activated curing agent.

15. The vulcanizate of claim 14 wherein the rubbery interpolymer is present in an amount of about 15–30 parts by weight for each 85–70 parts by weight of the highly unsaturated rubbery polymer.

16. The vulcanizate of claim 14 wherein the rubbery interpolymer is the product of the interpolymerization of ethylene, propylene and 5-ethylidene-2-norbornene, the highly unsaturated rubbery polymer is nitrile rubber, and the blend is cured with sulfur.

17. The vulcanizate of claim 16 wherein the rubbery interpolymer has an effective unsaturation level of about 2–25 carbon-to-carbon double bonds for each 1000 carbon atoms, the nitrile rubber is a copolymer of 1,3-butadiene and acrylonitrile and the acrylonitrile is chemically bound therein in an amount to provide at least 20 parts by weight of chemically bound acrylonitrile for each 100 parts by weight of the blend.

18. The vulcanizate of claim 17 wherein the rubbery interpolymer is present in an amount of about 15–30 parts by weight of each 85–70 parts by weight of the nitrile rubber, the nitrile rubber is a copolymer of 1,3-butadiene and acrylonitrile and the acrylonitrile is chemically bound therein in an amount to provide at least 33 parts by weight of chemically bound acrylonitrile for each 100 parts by weight of the blend.

19. A curable blend of rubbery polymers consisting essentially of about 1–95 parts by weight of highly unsaturated rubbery polymer selected from the group consisting of rubbery polymers of homopolymerizable halogenated conjugated diolefins containing 4–10 carbon atoms, rubbery interpolymers of said halogenated conjugated diolefins and ethylenically unsaturated alpha monoolefins interpolymerizable therewith, rubbery interpolymers of conjugated diolefins containing 4–10 carbon atoms and ethylenically unsaturated nitriles interpolymerizable therewith selected from the group consisting of acrylonitrile and alkyl-substituted acrylonitriles wherein the alkyl substitutent contains 1–5 carbon atoms, and rubbery interpolymers of said halogenated conjugated diolefins and said ethylenically unsaturated nitriles interpolymerizable therewith and mixtures thereof, for each 99–5 parts by weight of a rubbery interpolymer which is the product of the interpolymerization of ethylene, at least one alpha monoolefin containing 3–16 carbon atoms and alkylidene norbornene in which the alkylidene group has from 2–20 carmon atoms, the rubbery interpolymer having a mol ratio of chemically bound ethylene to the alpha monoolefin containing 3–16 carbon atoms between 80:20 and 20:80 and having an effective unsaturation level of at least 2 but less than 7 carbon-to-carbon double bonds per 1000 carbon atoms.

20. The blend of claim 19 wherein the rubbery interpolymer is present in an amount of about 1–50 parts by weight for each 99–50 parts by weight of the said highly unsaturated rubbery polymer.

21. The blend of claim 19 wherein the rubbery interpolymer is present in an amount of about 15–30 parts by weight for each 85–70 parts by weight of the highly unsaturated rubbery polymer.

22. The blend of claim 19 wherein the halogenated conjugated diolefin monomer and nitrile monomer which are chemically bound therein are present in an amount to provide at least 15 parts by weight of the said chemically bound monomers for each 100 parts by weight of the blend.

23. The blend of claim 19 wherein the rubbery interpolymer is the produce of the interpolymerization of ethylene, propylene and 5-ethylidene-2-norbornene.

24. The blend of claim 19 wherein the highly unsaturated rubbery polymer is nitrile rubber, the rubbery interpolymer is the product of the interpolymerization of ethylene, at least one straight chain alpha monoolefin having 3–10 carbon atoms and the alkylidene norbornene, and the rubbery interpolymer is present in an amount of about 1–50 parts by weight for each 99–50 parts by weight of the nitrile rubber.

25. The blend of claim 24 wherein the rubbery interpolymer is present in an amount of about 15–30 parts by weight for each 85–70 parts by weight of the nitrile rubber.

26. The blend of claim 25 wherein the nitrile monomer which is chemically bound in the nitrile rubber is present in an amount to provide at least 25 parts by weight of chemically bound nitrile monomer for each 100 parts by weight of the blend.

27. The blend of claim 24 wherein the rubbery interpolymer is the product of the interpolymerization of ethylene, propylene and 5-ethylidene-2-norbornene.

28. The blend of claim 27 wherein the nitrile rubber is a copolymer of 1,3-butadiene and acrylonitrile and the acrylonitrile is chemically bound therein in an amount to provide at least 20 parts by weight of chemically bound acrylonitrile for each 100 parts by weight of the blend.

29. The product obtained by curing the blend of claim 19 with a heat activated curing agent.

30. The vulcanizate of claim 29 wherein the rubbery interpolymer is present in an amount of about 15–30 parts by weight for each 85–70 parts by weight of the highly unsaturated rubbery polymer.

31. The vulcanizate of claim 29 wherein the rubbery interpolymer is the product of the interpolymerization of ethylene, propylene and 5-ethylidene-2-norbornene, the highly unsaturated rubbery polymer is nitrile rubber, and the blend is cured with sulfur.

References Cited

UNITED STATES PATENTS

| 3,151,173 | 9/1964 | Nyce | 260—80.78 X |
| 3,492,371 | 1/1970 | Barrett | 260—889 |
| 3,356,764 | 12/1967 | Gentile | 260—889 |
| 3,224,985 | 12/1965 | Gladding et al. | 260—5 |
| 3,179,718 | 4/1965 | Wei et al. | 260—889 |
| 3,093,620 | 6/1963 | Gladding et al. | 260—79.5 |

MURRAY TILLMAN, Primary Examiner

C. SECCURO, Assistant Examiner

U.S. Cl. X.R.

260—23.7 C, 23.7 M, 23.7 N, 30.6 R, 31.8 M, 32.4, 33.6 AQ, 33.6 PQ, 33.6 UA, 41.5 R, 79.5 B, 80.78, 829

Disclaimer 3,646,168.—*Robert E. Barrett*, Baton Rouge, La. OIL AND OZONE RESISTANT ELASTOMER BLENDS COMPRISING EPDM RUBBER. Patent dated Feb. 29, 1972. Disclaimer filed Aug. 12, 1971, by the inventor and the assignee, *Copolymer Rubber & Chemical Corporation.*

Hereby disclaims the portion of the term of the patent subsequent to Jan. 27, 1987.

[*Official Gazette May 22, 1973.*]